United States Patent [19]

Gilliam, Sr.

[11] 3,854,737

[45] Dec. 17, 1974

[54] COMBINATION ROTARY AND RECIPROCATING UNITARY SEALING MECHANISM

[75] Inventor: Howard E. Gilliam, Sr., North Tonawanda, N.Y.

[73] Assignee: Chemprene, Inc., Alden, N.Y.

[22] Filed: Jan. 21, 1974

[21] Appl. No.: 435,341

[52] U.S. Cl. .............................................. 277/205
[51] Int. Cl............................................ F16j 15/48
[58] Field of Search ........ 277/205, 206, 206.1, 209, 277/211

[56] References Cited
UNITED STATES PATENTS

| | | | |
|---|---|---|---|
| 1,770,193 | 7/1930 | Bragg et al....................... | 277/206.1 |
| 3,158,376 | 11/1964 | Rentschler........................... | 277/205 |
| 3,215,441 | 11/1965 | Horvereid........................... | 277/205 |
| 3,550,990 | 12/1970 | Rentschler.......................... | 277/206 |
| 3,612,551 | 10/1971 | Grabill............................ | 277/206 A |

FOREIGN PATENTS OR APPLICATIONS

| | | | |
|---|---|---|---|
| 1,185,726 | 2/1959 | France.............................. | 277/206.1 |

Primary Examiner—Harry N. Haroian
Assistant Examiner—Robert I. Smith
Attorney, Agent, or Firm—Alan M. Abrams; Robert E. Sloat

[57] ABSTRACT

A sealing mechanism is disclosed for use in combination rotary and reciprocating applications. In particular, the sealing mechanism disclosed can be used on single and double acting installations as a sealing mechanism in cylinders, pumps, valves, and rods. The sealing mechanism generally comprises a ring-like structure of the inner and outer sealing surfaces. Top and bottom portions of the seal are flat surfaces which contain channels which cause the side walls of the seal to flex when pressure is applied to such channels thereby substantially increasing the pressure of the sealing mechanism to the surface to which it is mated. In particular, the advantage of using the present seal is that excessive amounts of pressure need not be exerted by the seal against the surface to which it is mated. The seal only exerts increased pressure against the mating surface when pressure is applied to one of the flat surfaces of the seal. This reduces friction and heat generation and contributes to operating efficiency and longevity of the seal.

18 Claims, 4 Drawing Figures

PATENTED DEC 17 1974 3,854,737

COMBINATION ROTARY AND RECIPROCATING UNITARY SEALING MECHANISM

BACKGROUND OF THE INVENTION

1. Field of the Invention

The field of art to which this invention pertains is sealing mechanisms. More particularly, this invention relates to a sealing member which can be used in combination rotary or reciprocating, single or double acting installations as a seal against liquids or gases for use on cylinders, pistons, valves, and rodshafts.

2. Description of the Prior Art

There are many prior art systems utilized to seal pistons or rods. In particular, such seals are utilized to prevent leakage of fluids such as hydraulic oils or gases which are being pressurized by a piston or which are themselves used to move a piston. Probably the most prevalent use of seals under reasonably low pressure operations are in the hydraulic apparatus field. Also such sealing mechanisms are used in air lifts and jacks.

In particular, many problems arise in systems in which pressure on the seal located on a piston or in a rod sleeve is not constant. Additional problems can result when pressure is exerted on the piston or on the piston rod from two directions thereby requiring a specialized design in the seaing mechanism.

In systems in which a sealing mechanism is used one of the primary causes of wear on the system and the seal itself is the excessive friction caused by a constant rubbing of the seailng mechanism against the piston cylinder walls or the piston rod itself. More particularly such problems are particularly acute in systems in which one or more expansion rings are used to seal hydraulic oil or gaseous material which is under pressure. More particularly, when expansion rings are placed on the piston or in the rod sleeve they are designed to be constantly rubbing against the piston rod or the piston and exert enough friction on the walls of the cylinder or on the rod to prevent high pressure fluid or liquid from leaking during motion of the piston or the piston rod. Accordingly, when such expansion rings are utilized constant friction is produced which results in excessive wear on the seal and heat generation in the system which can cause many various problems.

An additional problem with many of the prior art sealing mechanisms is that they are free floating, being designed so that they shift slightly depending upon the direction of movement of the piston or the piston rod, in order to effectively seal the system. Additionally, in many such systems in which a double acting apparatus is utilized—that is, pressure exerted alternately on both sides of the sealing mechanism—a different design is generally needed for single acting systems as compared to the double acting systems. The improved sealing mechanism can be used in both single acting and double acting systems. One of the primary advantages of using the sealing mechanism is that the same design can be used in a single acting system as can be used in a double acting system.

Another important advantage of the presently claimed sealing mechanism is that the same basic design can be used whether the seal is placed upon a piston application or on a rod application. When used on a piston the inside diameter of the sealing ring is the static side, when such mechanism is used in a sleeve to seal a piston rod the static is on the outside diameter of the sealing mechanism. Accordingly, in order to design the presently presented sealing mechanism for each of the two above applications the designer must merely produce a mirror image of one of the sealing mechanisms in order for it to be used in the other application.

A further improvement of the present invention is that the sealing mechanism claimed and disclosed herein comprises a single piece of material as compared to the prior art constructions which utilized, in many instances, two or more pieces of material to form a sealing mechanism.

Another important advantage using the sealing mechanism claimed herein is that no complicated machining of the piston or of the rod sleeve is needed for a good fit of the present sealing mechanism. In particular, all that is necessary as far as machining of the piston or the rod sleeve in order for a proper fit of the claimed sealing mechanism is square groove. Such machining presents essentially no problems with respect to design consideration and ability to produce such machine part.

These and other advantages will be more particularly illustrated upon a further reading of the specification herein.

BRIEF SUMMARY OF THE INVENTION

The present invention can be summarized as a sealing mechanism having a top and bottom surface which surfaces are connected by a set of walls. The top and bottom surfaces of said sealing mechanism contain channels which are indented while at least one of the side walls contains lips which protrude from said wall and which are positioned adjacent to said top and bottom surfaces.

The invention can be further summarized as a sealing mechanism having a general ring-like construction which ring has inner and outer side walls with a top and bottom surface connected to said side walls. Said top and bottom surfaces have channels protruding into the sealing mechanism, either the inner or outer wall contains lips which protrude from said side wall and which are located adjacent to the top and bottom surfaces of the sealing ring.

A broad embodiment of my invention resides in a sealing mechanism described in relation to a horizontal plane which bisects said mechanism into upper and lower segments; said upper segment comprising an upper surface; a channel, located in said top surface and projecting towards said plane; a first side wall positioned substantially normal to said plane and connected to said upper surface; a second side wall positioned substantially normal to said plane and connected to a first lip, which lip is connected to said upper surface, said lip comprising an upper face which is attached to said upper surface, a lower face which is attached to said side wall, which upper and lower faces converge and are attached to a vertically positioned side face, said lower segment comprising a lower surface; a channel, located in said lower surface and projecting towards said plane; a third side wall positioned substantially normal to said plane and connected to said lower surface and to said first side wall; a fourth side wall positioned substantially normal to said plane connected to said plane connected to said second side wall and to a second lip which second lip is connected to said lower surface, the second lip comprising an upper face which is attached to said fourth side wall, a lower face which is connected to said lower surface, which upper face and lower face converge and are attached to a vertically positioned side face.

Another broad embodiment of my invention resides in a sealing mechanism having a general ring-like construction, described in relation to a vertical axis passing through an axial center of said sealing mechanism comprising:

a. a vertically positioned outer side wall having an upper end and a lower end;
 b. an upper lip attached to said upper end of the outer side wall and a lower lip attached to said lower end of the outer wall, said upper and lower lips protruding from said outside wall in a radial direction away from said axis, said upper and lower lips comprising upper and lower faces which converge in a radial direction away from said axis and meet at a side face which is vertically positioned;
 c. an upper surface connected to said upper face of said upper lip and extending radially from said upper face towards said axis;
 d. an upper channel located in said upper surface;
 e. a lower surface connected to said lower face of said lower lip and extending radially from said lower face towards said axis;
 f. a lower channel located in said lower surface; and
 g. an inner side wall connecting said upper and lower surfaces.

Another broad embodiment of my invention resides in a sealing mechanism having a general ring-like construction, described in relation to a vertical axis passing through an axial center of said sealing mechanism comprising:

a. a vertically positioned inner side wall having an upper end and a lower end;
 b. an upper lip attached to said upper end of the inner side wall and a lower lip attached to said lower end of the inner wall, said upper and lower lips protruding from said outside wall in a radial direction towards said axis, said upper and lower lips comprising upper and lower faces which converge in a radial direction towards said axis and meet at a side face which is vertically positioned;
 c. an upper surface connected to said upper face of said upper lip and extending radially from said upper face away from said axis;
 d. an upper channel located in said upper surface;
 e. a lower surface connected to said lower face of said lower lip and extending radially from said lower face away from said axis;
 f. a lower channel located in said lower surface; and
 g. an outer side wall connecting said upper and lower surfaces.

BRIEF DESCRIPTION OF THE DRAWINGS

In FIG. 1 there is shown the cross-sectional area of a sealing mechanism claimed herein considered to be the broad embodiment of the present invention. The sealing mechanism is divided into an upper segment 100 and a lower segment 101 by a horizontal plane A. As shown in the figure, the upper segments and the lower segments are symmetrical when proceeding along horizontal plane A.

Figure 1:
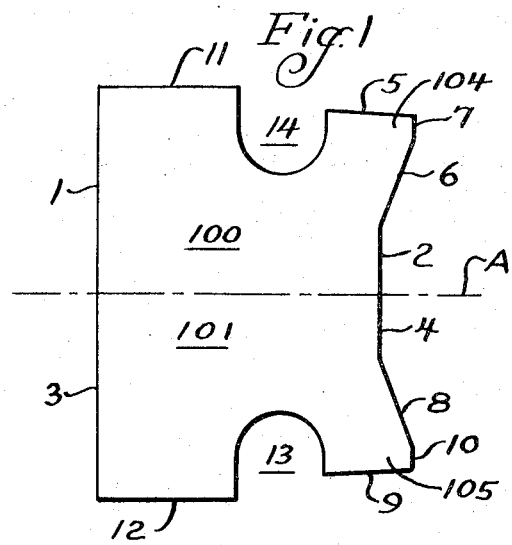
FIGS. 1 and 2 show two cross-sectional descriptions of the sealing mechanism described herein.

The upper segment contains upper surface 11 which is relatively horizontal and in many instances essentially parallel to the plane of the horizontal plane A. Connected to upper surface 11 is a first side wall 1 which is essentially perpendicular to the horizontal plane and upper surface 11. Essentially parallel to the first side wall 1 is a second side wall 2 which is connected to a first lip 104 which is represented as a protrusion from the second side wall. The first lip 104 comprises essentially three elements-namely, upper face 5 and lower face 6 which converge at side face 7. Side face 7 is essentially parallel with respect to the plane of the second side wall 2 and is vertically positioned.

Located within the upper segment is a channel 14 which cuts into the upper segment 101 and breaks the upper surface 11. As shown channel 14 is a semicircular trough but in many instances may be V- or square-shaped.

The lower segment 101 of the sealing mechanism as shown in FIG. 1 is essentially symmetrical with respect to the upper segment 100 and represents a mirror image of upper segment 100 with respect to plane A.

The basic elements of the lower segment 101 are third side wall 3, fourth side wall 4, second lip 105 protruding from the fourth side wall, and a lower surface 12 which contains channel 13. The second lip 105, as does the first lip 104, comprises essentially three elements—namely, upper face 8, a lower face 9 which upper and lower faces converge at a vertically positioned plane defined as a side face 10.

The sealing mechanism, as shown in FIG. 1, is represented as a cross-sectional view. The sealing mechanism preferably is a ring-like structure so it can be used for sealing a piston or a rod sleeve. As shown in FIG. 1, side walls 1 and 3 represent the static side of the sealing mechanism. Such static side is the portion of the sealing mechanism which does not rub against a surface of the appartus which utilizes the sealing mechanism. Preferably the static side of the sealing mechanism is placed in a groove which locks the sealing mechanism into place in such groove.

Side walls 2 and 4 represent the dynamic side of the sealing mechanism. The dynamic side represents the portion of the seal which rubs against a moving surface which surface is to be sealed. More particularly, side faces 7 and 10 are essentially parallel to the surface which is to be sealed against in order to provide an intimate contacting of the seal with such surface and to prevent unnecessary wear and breakage of the sealing mechanism itself.

Figure 2:
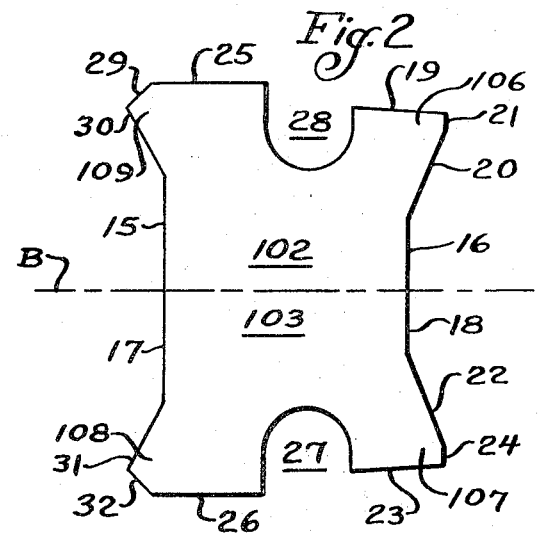

FIG. 2 shows a sealing mechanism essentially similar to the sealing mechanism shown in FIG. 1 except that the side walls 15 and 17 of FIG. 2 contain lips 108 and 109. Such lips can be used to cause the side walls 15 and 17 to be separated from the portion of the apparatus which holds the sealing mechanism. Such gap formed between the side walls 15 and 17 and the apparatus holding the seal is necessary in many instances to provide proper flexing of the sealing mechanism when in use. Lips 108 and 109 are shown as made up of essentially two elements. Lip 109 is made up of upper face 29 and lower face 30 which converge. Lip 108 is made up of upper face 31 and lower face 32 which converge and meet. Lips 108 and 109, when used on the static side of the sealing mechanism, need not contain a flat vertically positioned face where the upper and lower faces meet.

As in FIG. 1, the mechanism shown in FIG. 2 is bisected by horizontal plane B into upper segment 102 and lower segment 103. The upper segment comprises the first side wall 15 which contains lip 109 which is connected to upper surface 25. The second side wall 16 is connected to the lip 106 which contains similar elements to those shown for the lip 104 of FIG. 1. Lip 106 is connected to the upper surface 25 through channel 28.

Lower segment 103 contains third side wall 17 which contains lip 108 which is connected to lower surface 26. The fourth side wall 18 is connected to lip 107 which itself is connected through channel 27 to lower surface 26.

Figure 3:
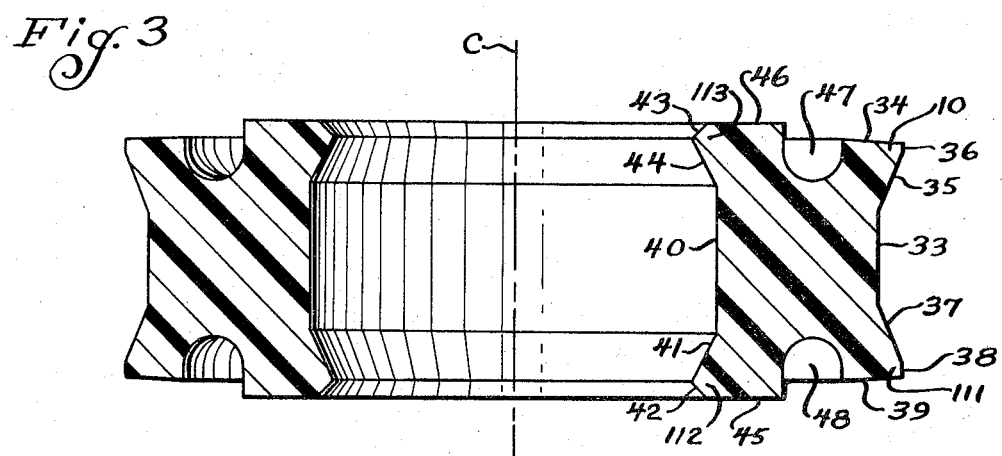
FIG. 3 shows the ring-like sealing mechanism which is designed for placement on a piston for a sealing application between the piston and the cylinder walls containing such piston.

FIG. 3 shows a cross-sectional view of the ring seal which can be used to seal a piston against a cylinder wall containing such piston. More particularly side 40 represents a vertically positioned inner wall which represents the static side of the sealing mechanism. Said vertically positioned inner wall 40 also contains upper lip 113 and lip 112. The upper lip 133 contains a lower face 44 and an upper face 43 which upper face is directly connected to an upper surface 46. The lower lip 112 contains an upper face 41 and a lower face 42 which lower face 42 is directly connected to a lower surface 45. Channel 47 connects upper surface 46 to upper face 34 of upper lip 110. Channel 48 connects lower face 39 of lower lip 111 to lower surface 45.

A vertically positioned outer wall 33 is shown as being connected to an upper lip 110 and a lower lip 111. The upper lip 110 contains an upper face 34 which is connected to a side face 36 which is connected to a lower face 35 which lower face is attached to the vertically positioned outer wall 33. Lower lip 111 contains an upper face 37 which is directly connected to the vertically positioned outer wall 33. Said upper face is connected to a side face 38 which itself is connected to a lower face 39. Lower face 39 is connected to lower surface 45 through the channel 48.

Figure 4:
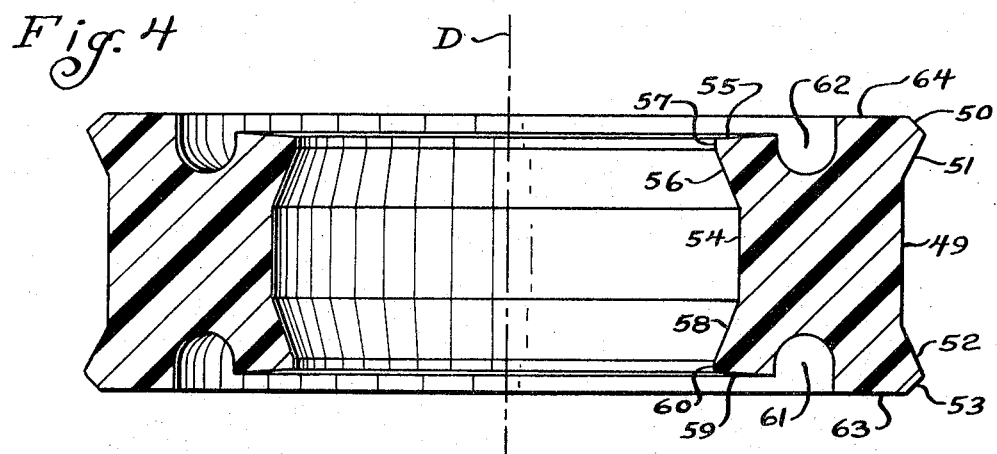
FIG. 4 shows a preferred sealing mechanism having a ring-like configuration which is used for placement in a rod sleeve sealing application. More particularly, in FIG. 4 the sealing mechanism has its inside diameter designed to seal against a rod or plunger moving within the sleeve.

FIG. 4 shows the cross-sectional area of a vertical repositioned plane which intersects said ring-like sealing mechanism. The sealing mechanism is shown as containing an axial radius D which passes vertically through the point of intersection of two or more diameters of said sealing mechanism.

The sealing mechanism shown in FIG. 4 can be used in instances in which the outside diameter of the sealing mechanism is desired to be the static side of the sealing mechanism. Such sealing mechanism can be employed to seal a rod by placing the sealing mechanism in the sleeve which surrounds the rod which is to be sealed. More particularly, the dynamic side of the sealing mechanism shown in FIG. 4 is the side of the sealing mechanism represented by inner wall 54. The remaining elements 50 through 64 of FIG. 4 represent substantially similar elements as shown in FIG. 3.

DETAILED DESCRIPTION OF THE INVENTION

The sealing mechanism as described in the attached claims can be used in many applications. In particular, the sealing mechaniism is suited for single, double acting and rotary applications. The single acting applications are those in which pressure is exerted on a sealing mechanism during normal operations generally from one direction. Double acting sealing applications generally are operations in which the piston or rod moves back and forth by the alternate application of pressure to each side of a sealing mechanism surrounding the piston or the rod being moved. Rotary applications include sealing a rotating shaft which, in some instances, is also reciprocating.

Such sealing mechanisms can be employed in systems utilizing liquids such as hydraulic oils, or gases in which a fluid is utilized under pressure to cause movement of a piston to perform a desired task.

The sealing mechanism claimed herein can be produced from all types of synthetic rubber-like materials including thermoplastic and thermosetting materials. Specifically the seals can be fabricated from elastomeric polymers, plastics, metals, etc. Specific examples include materials such as nitriles, neoprenes, polyurethanes, etc. It is possible to use reinforcing materials such as fibers of cloth or metal or fiberglass strands to strengthen the sealing mechanism. In one instance, a seal which is used in a hydraulic pressurized system can be fabricated from fabric reinforced elastomeric materials which are substantially resistant to oxidation and reaction with the hydraulic oil which is to be utilized in such system.

The particuular material selected to construct the claimed sealing mechanism should provide that the leakproof, low friction features of the invention may be maintained. It is preferred that the sealing mechanism be constructed of such material so as to allow the seal to be flexible since, as will be described hereinbelow, the grooves which are located in the upper and lower surfaces of the sealing mechanism are used to cause flexing of the lips on the dynamic side of the sealing mechanism.

The methods of fabrication of the above sealing mechanisms are not particularly critical and are assumed to be well known in the art. Such methods include compression and injection molding.

The shape of the sealing mechanisms claimed herein are not particularly critical. However, they generally should be selected from two general classifications. In one instance the sealing mechanisms, as depicted in FIGS. 1 and 2, can be straight rod-like materials and can be used in systems in which it is desired to seal a sliding flat material against pressure of a gas or liquid. In other instances the sealing mechanism, as depicted in FIGS. 3 and 4 are ring-like structures. The ring-like configurations are especially preferred, since in normal usage, such sealing mechanisms surround pistons, rods or shafts. Accordingly, it is especially preferred to produce the sealing mechanism claimed herein in a ring-like configuration and substantially symmetrical with respect to a plane located normal to the axial center of said seal.

In other instances, however, the sealing mechanisms may be of a design much different than the preferred ring-like configuration. In such instances the seal may resemble a rectangular shape. In any case, the important considerations used in defining the structure of the sealing mechanism include the various elements as described in the claim. No particular criticality attributed to the exact overall shape of the sealing mechanism utilized.

The overall dimensions of the sealable mechanism claimed herein and the shape of elongated strips are gnerally unlimited. The shape and dimensions of the interlocking seals claimed herein are dictated by the apparatus in which the sealing mechanism is to be used.

The terms "substantially normal," "substantially perpendicular" or "substantially parallel" are utilized in the specification and the claims to indicate relative position of various elements of the claimed sealing mechanism without limiting the claims to elements having exact perpendicular or parallel relationships. In particular, in referring to substantially normal or perpendicular relationships of elements, the angle of intersection of plane parallel to such elements can vary anywhere from about 70° to about 110°. In some instances the intersection of such planes vary even beyond the above range. In referring to substantially parallel elements the angle of intersection of planes exactly parallel to such elements can vary anywhere from around a few degrees up to 20° or more.

The first and third side walls should be relatively smooth and preferably lie in a single plane. In one instance the first and third side walls are essentially straight having no protrusions or indentations along their plane. Preferably the first and third straight walls are connected directly to the upper and lower surfaces and are so placed so that the upper and lower surfaces are essentially perpendicular to the plane of the first and third side walls. In some instances, the first and third side walls include lips which protrude generally at a right angle to the plane containing the essentially flat portions of the first and third side walls. In such instances the protrusions are preferably at the upper end of the first side wall and the lower end of the third side wall and also are connected to the upper and lower lower surfaces respectively. A specific preferred construction of such protrusions is shown in FIG. 2 of the drawings as lips 108 and 109.

The first and third side walls used to describe a cross-section of the sealing mechanism as shown in FIGS. 1 and 2 represent the static side of the sealing mechanism. The static side of the sealing mechanism is that side which holds the sealing mechanism in place. In particular, the sealing mechanism, when used as a piston sealing mechanism (piston rings), has its inside surface as the static side. The outside surface of such ring-like structure represents the dynamic side of the sealing mechanism which rubs against the inside portion of the cylinder wall containing such piston.

In instances in which the sealing mechanism is utilized to be contained within a sleeve which surrounds a rod or shaft, the inside surface area of such sealing mechanism is referred to as the dynamic portion while the outside surface of the ring-like sealing mechanism is referred to as the static section. The static section is that section which is locked into the groove which accepts the sealing mechanism located in the sleeve surrounding the rod or shaft. The dynamic portion of the seal is the inside surface being intimately in contact with a rotating shaft or a moving rod forming a tight seal with the surface thereof.

As used in the claims the second and fourth side walls represent the portion of the sealing mechanism, defined above, as the dynamic side. More particularly such second and fourth side walls are connected to lips which protrude essentially in a direction normal to the flat vertical plane of the second and fourth side walls. The second and fourth side walls are preferred to be one continuous flat plane.

The first and second lips of the sealing mechanism are attached to the dynamic portion of the sealing mechanism. Such lips are in contact with a moving surface and press against such surface to form an intimate seal and prevent leakage of a hydraulic oil or a gaseous material past the sealing mechanism.

The first and second lips are essentially identical in construction and they are attached to the second and fourth side walls respectively. In particular, the first lip is made up of three separate elements defined as an upper face, a lower face and a vertically positioned side face. The upper face is connected preferably to a channel which is located in the upper surface of the sealing mechanism. In many instances, the upper face may be directly connected to an upper surface and not through the channel. The lower face of the first lip is connected to said second side wall.

The second lip also contains an upper face, a vertically positioned side face and a lower face. Because of the position of the second lip being attached to the lower portion of the fourth side wall, its lower face is connected directly to either the channel located in a lower surface or the lower surface itself. The upper face of the second lip is connected to the fourth side wall.

It is preferred that the first and second lips extend in a direction normal to the second and fourth side walls and preferably identical distances from such side walls.

The upper and lower faces of the first and second lips should be smooth, flat surfaces and should be positioned so that their planes converge. The upper face and lower face of the first and second lips should meet at a vertically positioned side face which side face is the portion of the sealing mechanism which is actually in contact with a moving surface. It is preferable that the vertical side faces of the first and second lips be utilized in order to prevent fracturing tips of the lips when moving against the apparatus when performing a sealing operation.

The first lip located on the dynamic side of the sealing mechanism can have its upper face deviate from the horizontal as little as 1° to 3° or as many as 45° or more. The lower face of the first lip can deviate from a vertically positioned plane from as small as 1° to 3° to as many as 45° or more. The vertically positioned side face should be substantially vertical and should be machined or designed so that its face is essentially parallel to the plane of the material to which the seal is to rub against.

The second lip can have its upper and lower faces deviating from vertical and horizontal planes respectively from as little as 1° to 3° to as many as 45° or more. The vertically positioned side face can have any length dimension. It is preferable to reduce the length of the flat vertically positioned side face in order to minimize friction caused by the dynamic portion of the sealing mechanism. However, the length of this vertically positioned side face should be sufficient in order that the side face can maintain a reasonably close and tight seal against the surface to which it is to be mated.

Lips which can optionally be placed on the static side of the sealing mechanism may or may not contain vertically positioned side faces. Such lips have upper and lower faces which converge at any reasonably easily designed and machined angle.

The channels are located in or on the upper and lower surfaces and are indentations which preferably have semi-circular cross-sectional areas. Although these channels may also be in the form of rectangular or V-shaped indentations. The primary purpose for utilizing channels positioned on the upper and lower surfaces are that such channels can cause a flexing of the sealing mechanism towards the dynamic side of the sealing mechanism thereby increasing the pressure of the vertically positioned side face against the surface to which it is to be mated when fluid pressure is applied to such channels. When the pressure is relieved within the channel of the sealing mechanism the dynamic side of the sealing mechanism can retract to its normal position thereby reducing friction on the surface to which the vertically positioned side face of the first and second lips rubs. The channel can be any cross-sectional area and can extend in to the sealing mechanism to any desirable length.

The channel can be located in a position so that it can connect the first lip with the upper surface and the second lip with the lower surface or the channel can be positioned so that it cuts across the upper or lower surface respectively. In instances in which the channel intersects the upper or lower surface such upper or lower surface would then be directly connected to the upper face of the first lip and the lower face of the second lip. It is preferable, however, that the channel be located reasonably close to the dynamic side of the sealing mechanism in order that flexing of the dynamic portion of the sealing mechanism can take place during the initial stages of pressurization of the fluid or liquid located in the respective channels.

The upper and lower surfaces are preferably smooth, flat planes and are positioned substantially parallel through a horizontally positioned plane. More particularly the upper and lower surfaces can be substantially normal to the first, second, third and fourth side walls.

The upper and lower surfaces connect the dynamic and the static portions of the sealing mechanism.

When the sealing mechanism is described as a section of a ring-like configuration, the terms inner and outer vertically positioned side walls are used in place of walls 1 and 3 and walls 2 and 4 as used in describing FIGS. 1 and 2. Depending upon whether the outside portion or the inside portion of the ring-like sealing mechanism is the dynamic portion of the sealing mechanism, the lips which protrude from such inner and outer side walls can have varying functions. For instance, as shown in FIG. 3 where the dynamic portion of the sealing mechanism is its outside surface, the upper and lower lips located being connected to the vertically positioned outer wall are constructed substantially similar to those lips described as the first and second lips of FIGS. 1 and 2. When the inside portion of the sealing mechanism is the dynamic portion of the sealing mechanism as is shown in FIG. 4, the upper and lower lips, which are attached to the inner vertically positioned side wall, are substantially constructed the same as was described for the first and second lips shown in FIGS. 1 and 2.

I claim as my invention:

1. A sealing mechanism described in relation to a horizontal plane which intersects said mechanism into upper and lower segments; said upper segment comprising an upper surface; a channel, located in said upper surface and projecting towards said plane; a first wall vertically positioned with respect to said plane said connected to said upper surface; a second side wall vertically positioned with respect to said plane and connected to a first lip, which lip is connected to said upper surface and comprises an upper face which is attached to said upper surface, a lower face which is attached to said second side wall, which upper and lower faces converge and are attached to a vertically positioned side face; said lower segment comprising a lower surface; a channel, located in said lower surface and projecting towards said plane; a third side wall vertically positioned with respect to said plane and connected to said lower surface and to said first side wall; a fourth side wall vertically positioned with respect to said plane, connected to said second side wall and to a second lip, which lip is connected to said lower surface and comprises an upper face which is attached to said fourth side wall, a lower face which is connected to said lower surface, which upper and lower faces converge and are attached to a vertically positioned side face.

2. The seal mechanism of claim 1 further characterized in that said upper and lower segments are symmetrical with respect to said horizontal plane.

3. The seal mechanism of claim 1 further characterized in that first and third side walls are located in a single plane.

4. The seal mechanism of claim 1 further characterized in that said second and fourth side walls are located in a single plane.

5. The seal mechanism of claim 1 further characterized in that said channels have a semi-circular cross-sectional shape.

6. The seal mechanism of claim 1 further characterized in that said first side wall contains a protrusion which is connected to said upper surface.

7. The seal mechanism of claim 1 further characterized in that said third side wall contains a protrusion which is connected to said lower surface.

8. The seal mechanism of claim 1 further characterized in that said sealing mechanism is produced from an elastomeric polymer.

9. The seal mechanism of claim 1 further characterized in that said first and third, and said second and fourth side walls are parallel to each other.

10. The sealing mechanism of claim 1 wherein the mechanism is a ring.

11. A sealing mechanism having a general ring-like construction, described in relation to a vertical axis passing through an axial center of said sealing mechanism comprising:

a. a vertically positioned outer side wall having an upper end and a lower end;

b. an upper lip attached to the upper end of the outer side wall and a lower lip attached to the lower end of the outer side wall, said upper and lower lips protruding from said outer side wall in a radial direction away from said axis, said upper and lower lips comprising converging upper and lower faces which extend in a radial direction away from said axis and meet at a side face which is vertically positioned;

c. an upper surface connected to said upper face of said upper lip and extending radially from said upper face towards said axis;

d. an upper channel located in said upper surface;

e. a lower surface connected to said lower face of said lower lip and extending radially from said face towards said axis;

f. a lower channel located in said lower surface; and g. an inner side wall connecting said upper and lower surfaces.

12. The seal mechanism of claim 11 further characterized in that said inner side wall contains two lips which protrude radially toward said axis.

13. The seal mechanism of claim 12 further characterized in that said inner lips are connected to said upper and lower surfaces.

14. The seal mechanism of claim 11 further characterized in that said upper and lower channels are a semi-circular cross-sectional area as determined by a plane containing said axial axis.

15. A sealing mechanism having a general ring-like construction, described in relation to a vertical axis passing through an axial center of said sealing mechanism comprising:

a. a vertically positioned inner side wall having an upper end and a lower end;

b. an upper lip attached to the upper end of the inner side wall and a lower lip attached to the lower end of the inner side wall, said upper and lower lips protruding from said inner side wall in a radial direction towards said axis, said upper and lower lips comprising converging upper and lower faces which extend in a radial direction towards said axis and meet at a side face which is vertically positioned;

c. an upper surface connected to the upper face of said upper lip and extending radially from said upper face away from said axis;

d. an upper channel located in said upper surface;

e. a lower surface connected to the lower face of the lower lip and extending radially from said lower face away from said axis;

f. a lower channel located in said lower surface; and g. an outer side wall connecting said upper and lower surfaces.

16. The seal mechanism of claim 15 further characterized in that said outer side wall contains two outer lips which protrude radially away from said axis.

17. The seal mechanism of claim 16 further characterized in that said outer lips are connected to said upper and lower surfaces.

18. The seal mechanism of claim 15 further characterized in that said upper and lower channels are a semi-circular cross-sectional area as determined by a plane containing said axial axis.

* * * * *

UNITED STATES PATENT OFFICE
CERTIFICATE OF CORRECTION

Patent No. 3,854,737       Dated   December 17, 1974

Inventor(s)   Howard E. Gilliam, Sr.

It is certified that error appears in the above-identified patent and that said Letters Patent are hereby corrected as shown below:

Column 1, line 32 - "seailng" should read "sealing".

Column 5, line 38 - "upper lip 133" should read "upper lip 113".

Column 6, line 11 - "mechaniism" should read "mechanism".

Column 6, line 40 - "particuular" should read "particular".

Column 7, line 14 - "gnerally" should read "generally".

Column 10, line 14 and line 15 - "a first wall" should read "a first side wall".

Column 10, line 15 - The last word of that line "said" should be replaced with the word "and".

Column 10, line 40 - "in that first" should read "in that said first".

Signed and sealed this 8th day of April 1975.

(SEAL)
Attest:

RUTH C. MASON
Attesting Officer

C. MARSHALL DANN
Commissioner of Patents
and Trademarks